United States Patent [19]

Iwai et al.

[11] Patent Number: 5,414,482
[45] Date of Patent: May 9, 1995

[54] PREWINDING CONTROL DEVICE OF CAMERA

[75] Inventors: Fumio Iwai; Katsuji Ozawa; Michihiro Shiina, all of Omiya, Japan

[73] Assignee: Fuji Photo Optical Co., Ltd., Saitama, Japan

[21] Appl. No.: 12,732

[22] Filed: Feb. 3, 1993

[30] Foreign Application Priority Data

Feb. 5, 1992 [JP] Japan .................................. 4-054200

[51] Int. Cl.$^6$ ................................................ G03B 1/18
[52] U.S. Cl. ................................................ 354/173.1
[58] Field of Search ............... 354/173.1, 484, 173.11, 354/289.1, 289.11, 289.12

[56] References Cited

U.S. PATENT DOCUMENTS

| | | | |
|---|---|---|---|
| 4,598,986 | 7/1986 | Shiratori et al. | 354/289.1 |
| 4,676,621 | 6/1987 | Malloy Desormeaux | 354/173.1 |
| 4,910,543 | 3/1990 | Kawamura et al. | 354/173.1 |
| 4,918,474 | 4/1990 | Kawamura et al. | 354/173.1 |

Primary Examiner—Howard B. Blankenship

[57] ABSTRACT

A pre-winding control device of a camera which continues pre-winding from where it left off after a power failure interruption and battery replacement. When a patrone is loaded in the camera, the total number exposures is read from the patrone and the read number of written to an electrically rewritable non-volatile memory E$^2$PROM. Subsequently, pre-winding for winding the film from the patrone to a spool is started. For every frame of film wound to the spool, the number of unexposed frames in the patrone is counted down and written to the E$^2$PROM. When pre-winding is interrupted due to battery replacement, pre-winding is continued based on the number of unexposed frames stored in non-volatile E$^2$PROM.

9 Claims, 7 Drawing Sheets

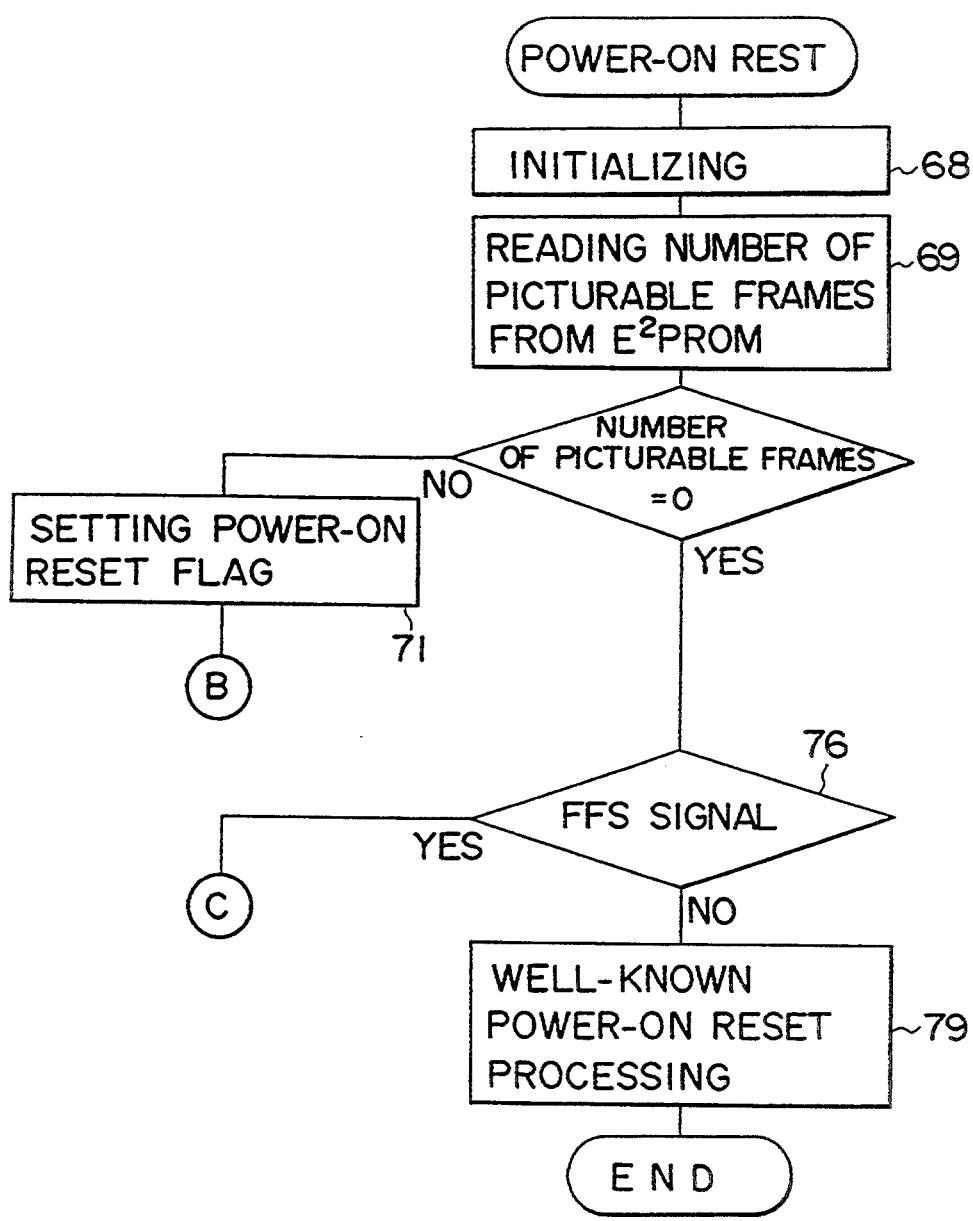

PREWINDING CONTROL DEVICE OF CAMERA

BACKGROUND OF THE INVENTION

The present invention relates to a pre-winding control device of a pre-wind type camera.

In pre-wind type cameras, the film of the patrone is pre-wound to the spool. After the film is completely wound to the spool, a first frame setting is performed for rewinding the film to the patrone by a prescribed length until the first frame is reached. In a conventional camera of the pre-wind type, if battery replacement occurs during pre-winding, the camera will start rewinding from where pre-winding was interrupted since pre-winding was never completed. As a result, not only is the film wasted, but the loading of another film is also required.

SUMMARY OF THE INVENTION

It is an object of the present invention to provide an improved pre-winding control device for a camera.

Another object of the present invention is to provide a pre-winding control device for a camera for which avoids wasting film and the consequent need to load a new film by the capability of continuing pre-winding after battery replacement.

The above and other objects are attained by a pre-winding control device of a camera comprising; an electrically rewritable non-volatile memory E$^2$PROM; a first writing means, responsive to a closing of the rear cover of the camera, for reading the total number of exposures of a patrone loaded in the camera and for writing the number of picturable frames to said E$^2$PROM; pre-winding means, responsive to an end of a writing of said first writing means, for starting pre-winding of the film to a spool, said pre-winding means counting the number of exposed frames of the film wound to the spool and finishing the pre-winding when the film is completely wound to the spool; second writing means, responsive to a count of the number of exposed frames of the film of said pre-winding means, for decrementing the number of exposed frames by 1 for every exposed frame counted and wound to the spool during pre-winding, and for rewriting the updated number of exposed frames to said E$^2$PROM; and pre-winding continuing means, responsive to replacement of the battery in the camera, for continuing pre-winding, when in case the number of unexposed frames in said E$^2$PROM is not "0" (zero), by driving said pre-winding means based on the number of unexposed frames stored in said non-volatile E$^2$PROM

BRIEF DESCRIPTION OF THE DRAWINGS

The foregoing objects, features and attendant advantages of the present invention will be appreciated as the same become better understood by means of the following description and accompanying drawings wherein;

FIG. 7 is a flow diagram of the power-on reset operation which is triggered by battery replacement.

DETAILED DESCRIPTION OF THE INVENTION

Figure 1:
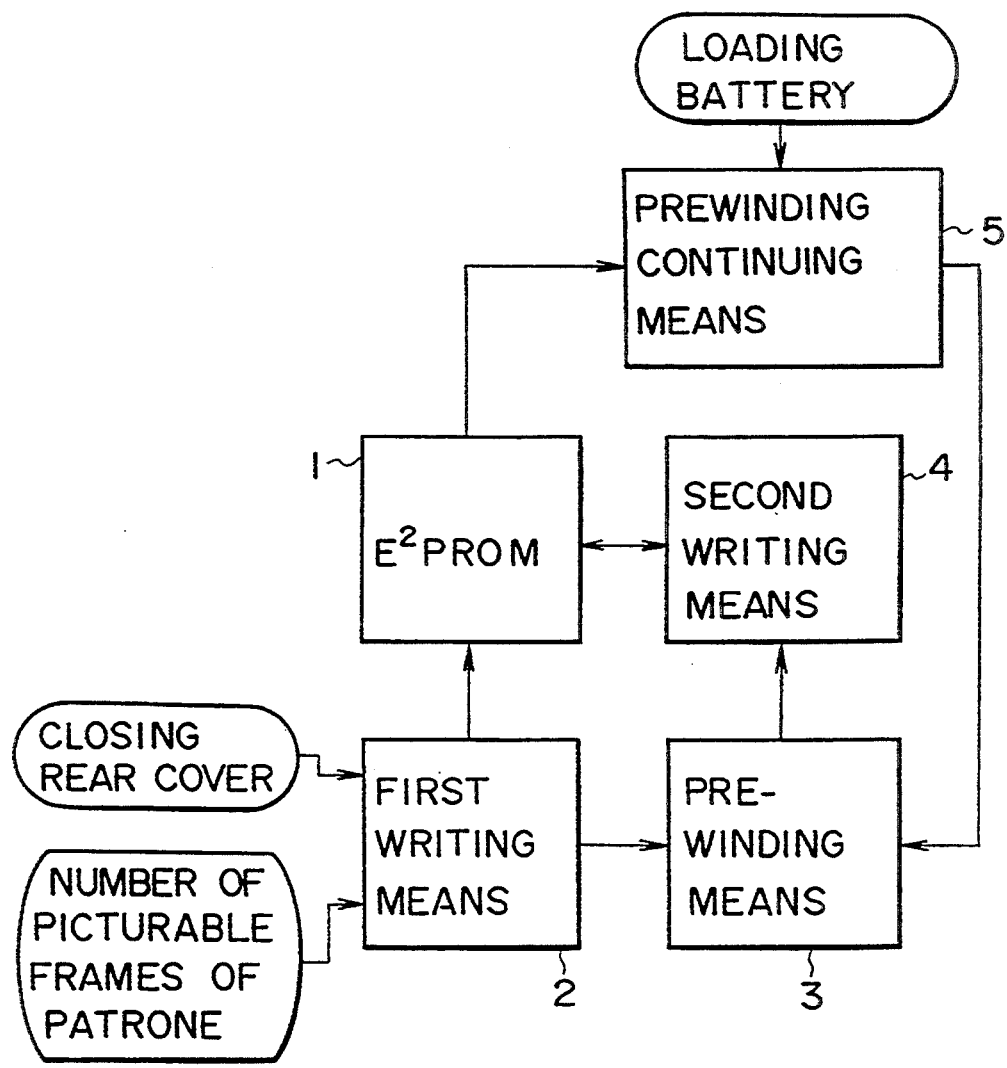
FIG. 1 is a block diagram showing a fundamental embodiment of a pre-winding control device of a camera according to the present invention.

In the first fundamental embodiment of FIG. 1, reference numeral 1 is an electrically rewritable non-volatile memory E$^2$PROM (Electronic Erasable and Programmable ROM). First writing means 2, responsive to a closing of the rear cover of the camera, reads the total number of exposures of a patrone which is loaded in the camera, and writes the total number of exposures to the E$^2$PROM 1. Pre-winding means 3, responsive to an end of writing of the first writing means 2, for winding of the film to a spool. Also, the pre-winding means 3, for counting the number of exposed frames of the film wound to the spool, and for finishing pre-winding when the film is completely wound to the spool. Second writing means 4, responsive to the pre-winding means 3, for counting down the number of unexposed frames for every exposed frame the pre-winding means 3 winds to the spool and for writing the updated number of unexposed frames to the E$^2$PROM 1. Pre-winding continuing means 5, responsive to battery replacement, for driving the pre-winding means 3 based on the number of unexposed frames stored in the non-volatile E$^2$PROM 1, and for continuing pre-winding unless the number of unexposed frames stored in said E$^2$PROM is "0" zero). When pre-winding is interrupted for battery replacement, the number of unexposed frames subtracting the number of frames wound up to the spool from the number of picturable frames, which is obtained from the is stored in the non-volatile E$^2$PROM 1. Upon battery replacement, if the number of unexposed frames written in the E$^2$PROM 1 is not "0", the pre-winding is continued and the pre-winding means 3 is driven by the pre-winding continuing means 5 based on the number of unexposed frames written in the E$^2$PROM 1. The above-mentioned fundamental embodiment will be better understood by the following preferred embodiment.

Figure 2:
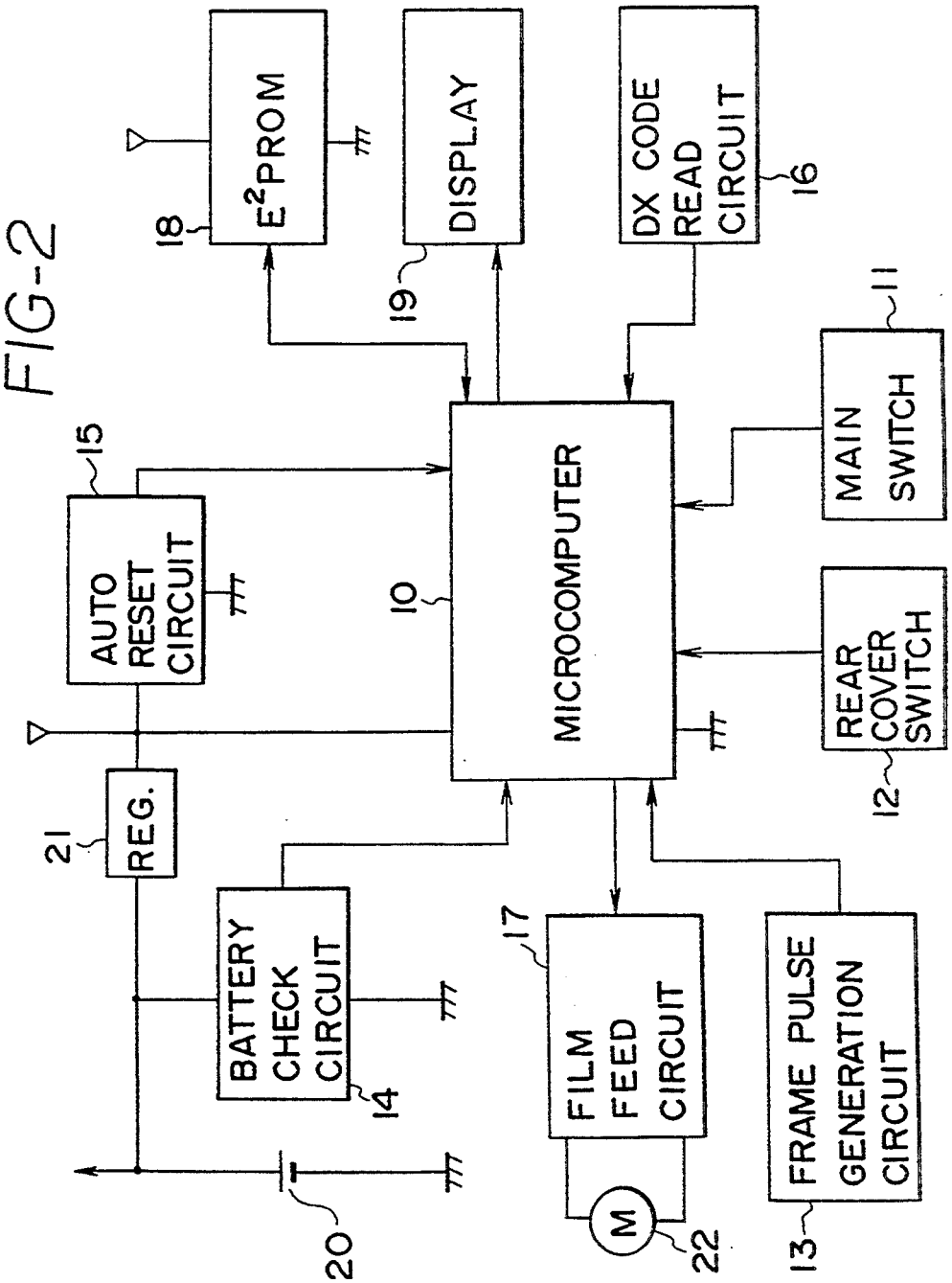
FIG. 2 is a block diagram showing a preferred embodiment of a pre-winding control device of a camera according to the present invention.

In the preferred embodiment of FIG. 2, reference numeral 10 is a microcomputer. The microcomputer 10 receives an on/off signal from a main switch 11, an on/off signal from a rear cover switch 12, a frame pulse from a frame pulse generation circuit 13, battery check information from a battery check circuit 14, a reset signal from an auto reset circuit 15, and the number of exposures from a DX code read circuit 16, which reads the number from the DX code on the patrone. The microcomputer 10 controls the driving of a film feed circuit 17, the writing/reading of an electrically rewritable non-volatile memory E$^2$PROM 18, and the writing to the display 19. Reference numeral 20 is a battery of the camera, which supplies power to the film feed circuit 17 and other, circuits and supplies power to the microcomputer 10 and the E$^2$PROM 18 via regulator 21.

The main switch 11 is interlocked with the opening and closing of a lens barrier which is the cover of the camera lens. The main switch 11, with the opening of the lens barrier, gives an on signal to the microcomputer 10. The rear cover switch 12 is interlocked with the opening and closing of the rear cover of the camera. The rear cover switch 12, with the closing of the rear cover of the camera, gives an "on" signal to the microcomputer 10. The frame pulse generation circuit 13, which detects the perforation of the film, generates a frame pulse each time the film is fed by a prescribed length, and sends a frame pulse to the microcomputer 10. The battery check circuit 14 is connected in parallel to the battery 20 of the camera, and gives battery check information, indicating whether the battery 20 has a minimum prescribed voltage, to the microcomputer 10. The above-mentioned prescribed voltage is set experimentally based on a voltage level at which the feeding of the film cannot be performed properly. The auto reset circuit 15 is connected via the regulator 21 to the battery 20, and gives, a reset signal to the microcomputer 10. The microcomputer 10 when the battery 20 is replaced is backed up only for a short time by a back-up capacitor (not shown in the drawing) when the battery 20 is taken out. The auto reset circuit 15, does not send a reset signal if the battery 20 is replaced while the power source is backed up, by the back-up capacitor. The DX code read circuit 16 reads the total number of exposures from a DX code on the patrone, and sends the total number of exposures to the microcomputer 10. The film feed circuit 17, under the control of the microcomputer 10, drives a film feed motor 22 in either the forward or reverse directions. The display 19, under the control of the microcomputer 10, displays the number of exposed frames of the film along with other information. The microcomputer 10 reads the total number of exposures from the patrone before the start of pre-winding, and writes the total number of exposures to the $E^2PROM$ 18. The microcomputer 10 counts the number of exposed frames of the film wound to the spool during pre-winding, counts down the number of unexposed frames each time the number of exposed frames is updated, and rewrites the updated number of unexposed frames to the $E^2PROM$ 18. The microcomputer 10, at the start of the first frame, writes a first frame set signal (FFS signal) to the $E^2PROM$ 18 indicating that first frame setting is under way, and erases the first frame set signal at the end of the first frame setting. If battery replacement occurs during pre-winding or first frame setting, the microcomputer 10 continues the pre-winding and the first frame setting based on the number of unexposed frames and the first frame set signal stored in the $E^2PROM$ 18, respectively.

Figure 3:
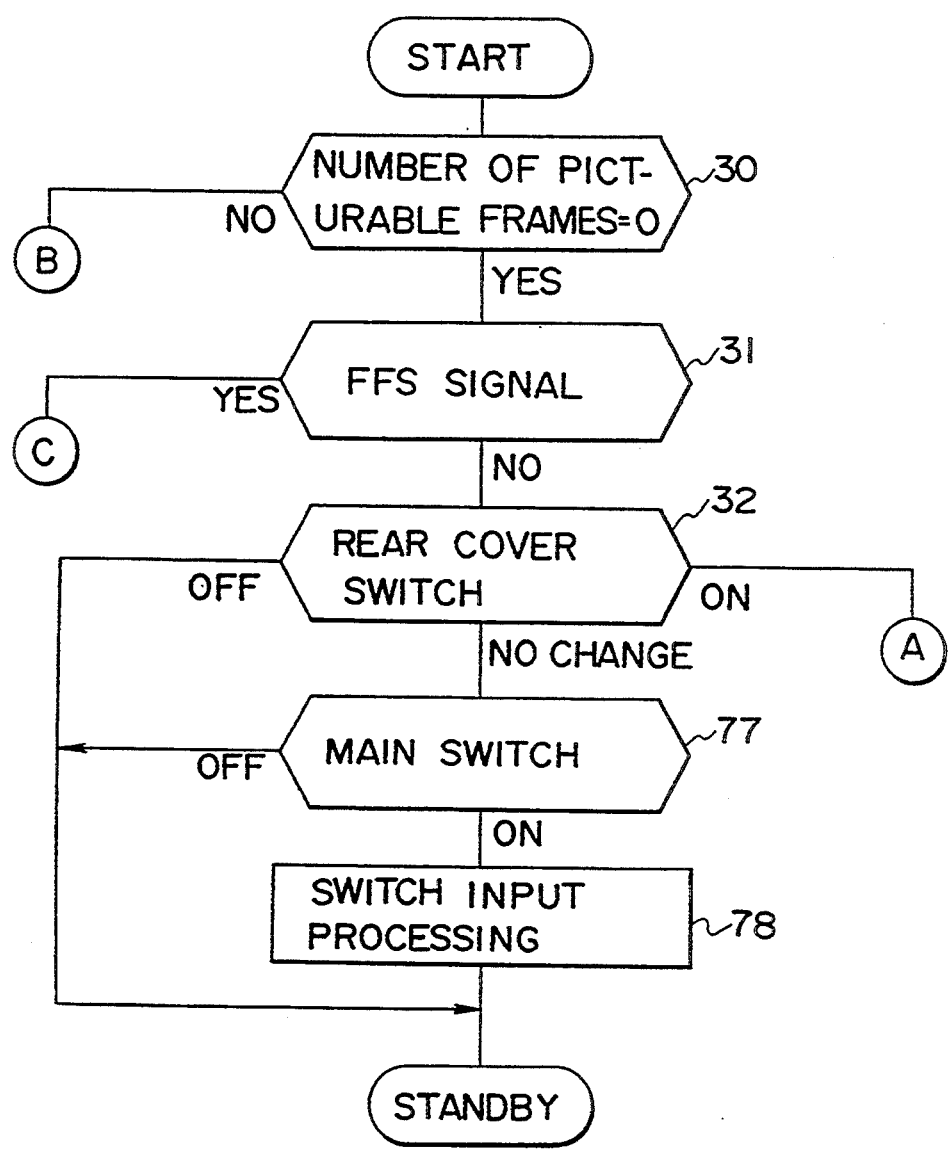
FIG. 3 is a flow diagram showing the operation of the rear cover and main switches during power-up or battery replacement.
Figure 4:
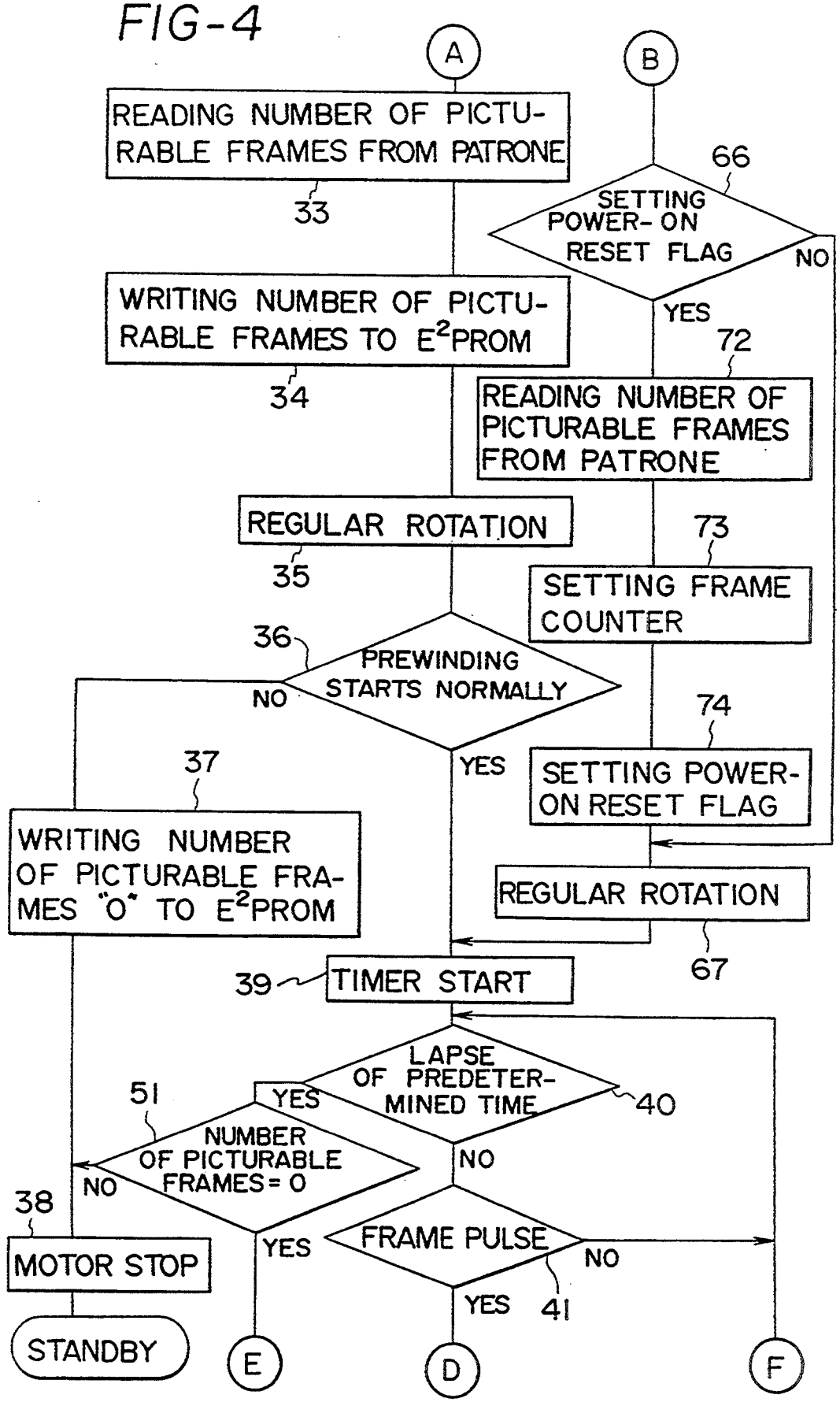
FIG. 4 is a flow diagram of the film pre-winding operation.
Figure 5:
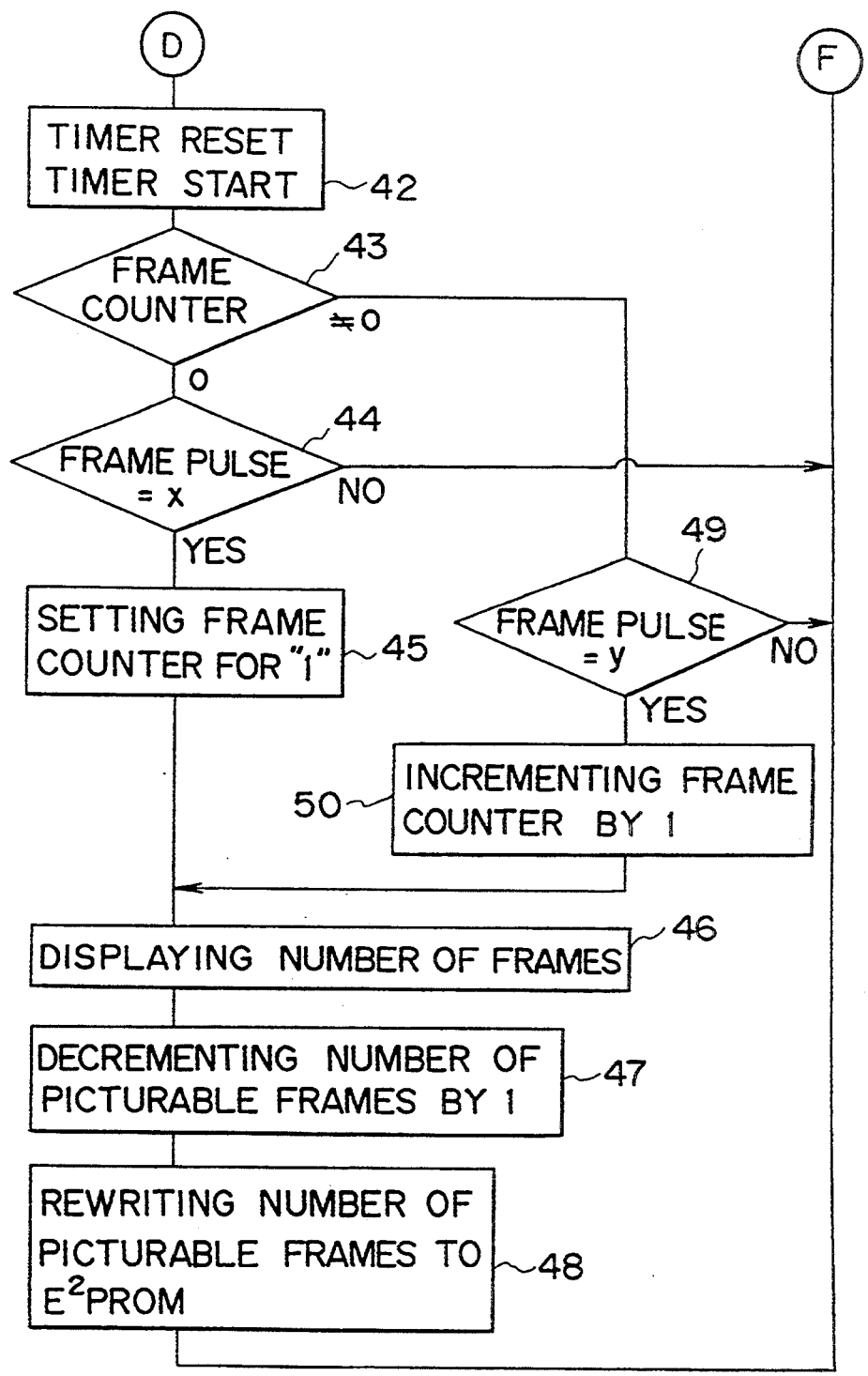
FIG. 5 is a continuation of the flow diagram of FIG. 4 depicting the count of frames during the pre-winding operation.
Figure 6:
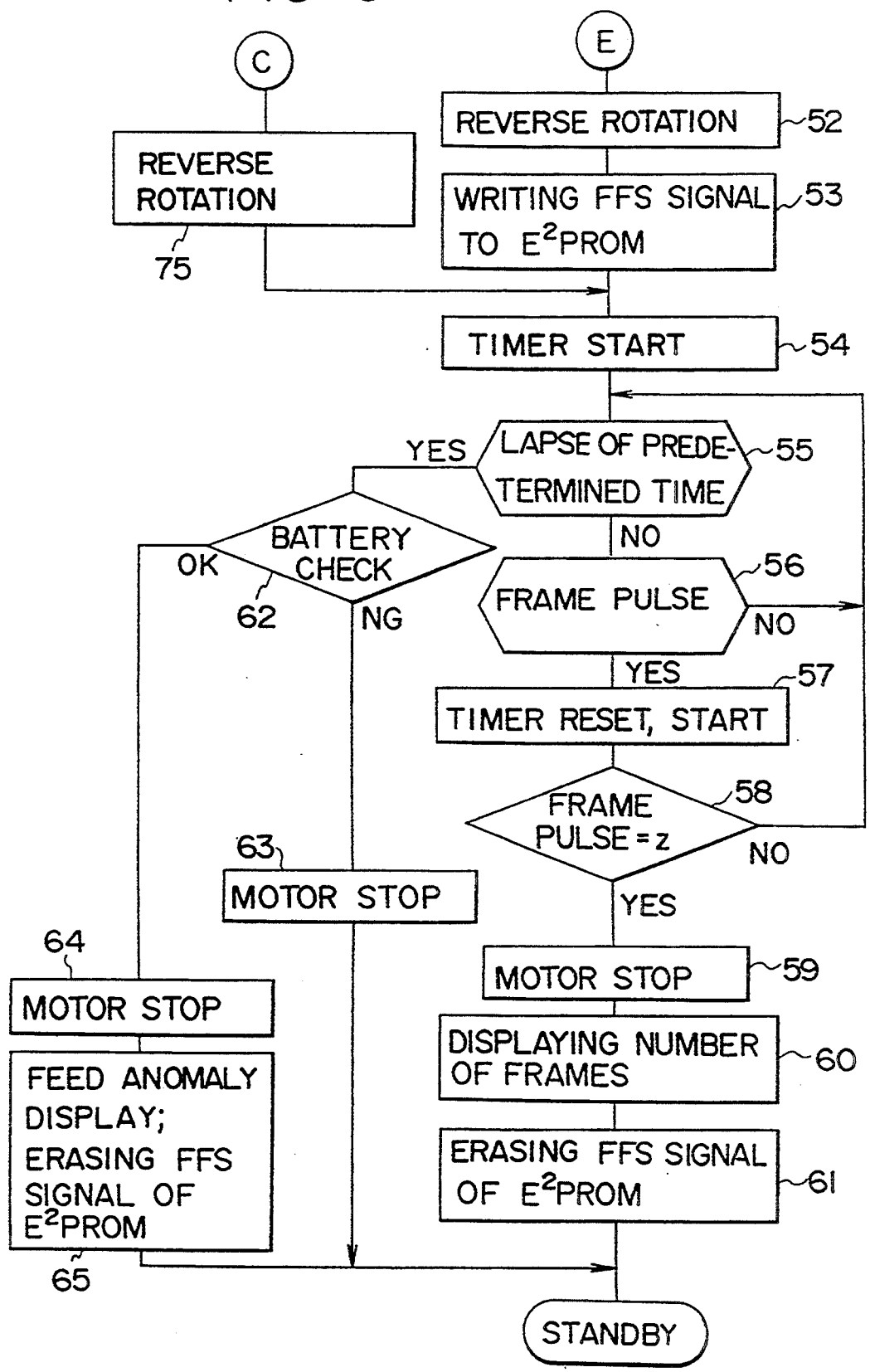
FIG. 6 is a flow diagram showing the rewinding operation and first frame setting.

FIGS. 3–7 are flow diagrams of the microcomputer 10 operations. FIG. 3 shows the power-up or battery replacement sequence, including the operation of the main switch 11 and the rear cover switch 12. FIGS. 4 and FIG. 5 show the pre-winding operation. FIG. 6 shows the rewinding operation and first frame setting. FIG. 7 shows the power-on reset operation which is triggered by battery replacement. executed when the Terminals A, B and C of FIG. 3 and FIG. 7 are connected to teminals A, B and C of FIG. 4 and FIG. 6, and terminals D, E and F of FIG. 4 are connected to terminals D, E and F of FIG. 5 and FIG. 6.

When a film is loaded and the rear cover of the camera is closed, the rear cover switch 12 sends an on signal to the microcomputer 10. The microcomputer 10 starts the control shown in FIG. 3 and, depending on whether the number of unexposed frames of step 30 is "0", whether a first frame set signal (FFS signal) exists at step 31 and whether the rear cover switch 12 is on at step 32, the microcomputer 10 will begin the pre-winding operation of FIG. 4.

The microcomputer 10, in step 33 of FIG. 4, reads the total number of exposures from the DX code of the patrone via the DX code read circuit 16 and, in step 34, writes the total number of exposures read from the patrone to the $E^2PROM$ 18. The microcomputer 10, in step 35, starts the winding of the film from the patrone to the spool by driving the film feed motor 22 and, in a following step 36, judges whether pre-winding has started properly. This judgment is done based on whether a frame pulse was given from the frame pulse generation circuit 13 within a prescribed time after the start of pre-winding. If the frame pulse is not given within the prescribed time, the microcomputer 10 moves from step 36 to step 37. The microcomputer 10, in step 37, writes a "0" for the total number of exposures to the $E^2PROM$ 18 and, in step 38, stops the film feed motor 22 and goes into standby status. If the frame pulse is sent within the prescribed time, the microcomputer 10, recognizing that pre-winding has started properly, moves from the step 36 to step 39. The microcomputer 10, in step 39, starts an internal timer to run for a predetermined interval. This predetermined time is set based on the time interval after between when a frame pulse is sent and when the next frame pulse is sent during pre-winding. The microcomputer 10, in step 40, judges whether the predetermined time interval of the internal timer has lapsed. If the predetermined time interval has not lapsed, the microcomputer 10 moves from step 40 to step 41, and judges whether a frame pulse has been sent. If no frame pulse has been sent, the microcomputer 10 returns from step 41 to step 40. If a frame pulse has been sent, the microcomputer 10 moves from step 40 to step 42 in FIG. 5, resets and restarts the internal timer, and enters step 43. The microcomputer 10, in step 43, judges whether the number of exposed wound to the spool is "0". The number of exposed frames wound to the spool is counted by a frame counter in the microcomputer 10. In this embodiment, as described later, the frame counter is set for "1" when a first number up frame pulses are sent from the frame pulse generation circuit 13 and after pre-winding has started properly. After that, for subsequent counting the frame counter is increment by 1 each time a second number of frame pulses are sent. If the frame counter is "0" at the start of pre-winding, the microcomputer 10 moves from step 43 to step 44, and determines whether a first number of frame pulses has been sent from the frame pulse generation circuit 13. If the number of frame pulses has not reached a first number of pulses, the microcomputer 10 returns from step 44 to step 40 of FIG. 4. When the number of frame pulses reaches a fist number of pulses, the microcomputer 10 moves from step 44 to step 45, sets the frame counter to "1" and resets the frame pulse count. Subsequently, the microcomputer 10, in step 46, displays the count of the frame counter on the display 19, in step 47, decrements the number of unexposed frames stored in the $E^2PROM$ 18 by 1, in step 48, rewrites the updated number of unexposed frames to the $E^2PROM$ 18, and returns to step 40 of FIG. 4. When the frame counter has a count greater than 0, the microcomputer 10 moves to step 49 of FIG. 5, and judges whether y frame pulses have been given. If the number of frame pulses has not reached a second number of pulses, the microcomputer 10 returns to step 40 of FIG. 4. When the number of frame pulses has reached a second number of pulses, the microcomputer 10 moves from step 49 to step 50, increments the frame counter, by 1 resets the count of frame pulses, and, returns to step 40 of FIG. 4 via steps 46–48. When the film is completely wound from the patrone to the spool, the predetermined time interval has run, and no frame pulses have been received from the frame pulse generation circuit 13, the microcomputer 10 moves from step 40 to step 51. The microcomputer 10, in step 51 of FIG. 4, determines whether the number of unexposed frames written to the E²PROM 18 has reached "0". If the number of unexposed frames written to the E²PROM 18 is not "0", the microcomputer 10 enters step 38. If the number of unexposed frames written in the E²PROM 18 is "0", the microcomputer 10, recognizing that pre-winding has been done properly, proceeds to the first frame setting operation of FIG. 6.

If the battery 20 is replaced during pre-winding the number of unexposed frames is stored in the non-volatile E²PROM 18. If the battery 20 is exhausted during pre-winding, the microcomputer 10 will go into standby status via steps 40, 51 and 38, and the number of unexposed frames is stored in the non-volatile E²PROM 18.

In the first frame setting of FIG. 6, the microcomputer 10 drives the film feed motor 22 in the reverse direction step 52, and starts the first frame setting. The microcomputer 10 moves from the step 52 to step 53, writes a first frame set signal (FFS signal) to the E²PROM 18 and, in step 54, starts the internal timer running for a predetermined interval. The microcomputer 10, in step 55, judges whether the predetermined time interval has lapsed and, if the predetermined time interval has not lapsed, the microcomputer 10 judges whether a frame pulse has been given in step 56. If no frame pulse has been given, the microcomputer 10 returns from step 56 to step 55. When a frame pulse has been given, the microcomputer 10, in step 57, resets the internal timer, restarts the internal timer, and then moves to step 58. The microcomputer 10, in step 58, judges whether z frame pulses has been given. If the number of frame pulses has not reached z pulses, the microcomputer 10 returns from step 58 to step 55. When z frame pulses has been given, the microcomputer 10, moves from step 58 to step 59, stops the reverse driving of the film feed motor 22, displays the number of unexposed frames on the display 19 in step 60 and, in step 61, erases the first frame set signal of the E²PROM 18, and goes into standby status. If, in step 55, no frame pulse has been given during the predetermined time interval, the microcomputer 10, moves from step 55 to step 62, receives battery check information from the battery check circuit 14, and determines whether the voltage level of battery 20 is sufficient for proper film feeding. If the battery voltage level 20 is below the prescribed voltage for proper film feeding, the microcomputer 10, moves from step 62 to step 63, stops the reverse driving of the film feed motor 22, and goes into standby status. If the battery voltage level is above the prescribed voltage for proper film feeding, the microcomputer 10 moves from step 62 to step 64, stops the reverse driving of the film feed motor a step 65, displays a feed anomaly signal on the display 19 to urge repair, erases the first frame set signal of the E²PROM 18, and goes into standby status.

If the battery 20 is replaced during first frame setting, the erasure of the first frame set signal of step 61 is not performed before the microcomputer 10 goes into standby status. Rather, a standby status is attained reached through the step sequence of steps 55, 62 and 63, and thus, the erasure of the first frame set signal is not performed. When a feed anomaly is detected in step 65, the first frame set signal is erased to prevent the camera system, after repair of the feed anomaly, from starting from the first frame setting. If the battery 20 is replaced while the power source is backed up, by the back-up capacitor the microcomputer 10 starting at step 30 of FIG. 3, determines whether the number of unexposed frames of the E²PROM 18 is "0". If the number of unexposed frames stored in the E²PROM 18 is not "0" such as when the battery is replaced during pre-winding, the microcomputer 10 moves from step 30 to a step 66 of FIG. 4, and determines whether a power-on reset flag has been set. The power-on reset flag is set by the power-on reset sequence of FIG. 7, which will be discussed later. If the battery 20 is replaced while the power source is backed up by the back-up capacitor, the power-on reset flag is not set, and the microcomputer 10, moves from step 66 to step 67, drives the film feed motor 22, in the forward direction step 39, and continues pre-winding based on the number of exposed frames retained in the frame counter of the microcomputer 10.

When pre-winding is interrupted and the battery is replaced while the power source is no longer backed up, the reset signal is sent from the auto reset circuit 15 to the microcomputer 10, and the power-on sequence of FIG. 7 is commenced. The power-on reset sequence starts by initializing the microcomputer 10 in step 68 and by reading the number of unexposed frames stored in E²PROM 18 in step 69. Then, in step 70, the microcomputer 10 determines whether the number of unexposed frames is "0". Since pre-winding has been interrupted, the number of unexposed frames stored in the E²PROM 18 is not "0"the a power-on reset flag is set in step 71, and the microcomputer 10 moves to step 66 of FIG. 4. Since the power-on reset flag is set, the microcomputer 10, via steps 72, 73 and 74, commences regular rotation of the film feed motor 22 in step 67, and continues the pre-winding. In step 72, the total number of exposures is read via the DX code read circuit 16. In step 73, the number of exposed frames already wound to the spool is computed by subtracting the number of unexposed frames stored in E²PROM 18 from the number of exposures and then, the computed number of exposed frames; is written to the frame counter. In step 74, the power-on reset flag is set.

When the battery 20 is replaced during first frame setting and the power source is backed up by the back-up capacitor, the microcomputer 10, starting at step 30, determines that the number of unexposed frames is 0 and moves on to step 31, where it determines whether the first frame set signal has been set step 31. When first frame setting is interrupted by battery replacement, the first frame set signal is stored in the non-volatile E²PROM 18, and, the microcomputer 10 moves from step 31 to step 75 of FIG. 6. The microcomputer 10, in step 75, commences reverse rotation of the film feed motor 22, and after subsequently moves to step 54 to continue the first frame setting. When the battery 20 is replaced while the power source is not backed up, a reset signal is sent from the auto reset circuit 15 to the microcomputer 10 and the power-on reset sequence of FIG. 7 is commenced. The microcomputer 10, after initializing in step 68, and reading the number of unexposed frames stored in the E²PROM 18 in step 69, determines whether the number of unexposed frames is "0" in step 70. Since the number of unexposed frames during first frame setting is zero, the microcomputer 10 moves to step 76 to determine whether the first frame set signal has been sent. Since the first frame set signal is stored in the non-volatile E²PROM 18, the microcomputer 10, moves from step 76 to step 75 of FIG. 6, where it continues first frame setting.

When the main switch 11 is operated, the microcomputer 10, via the step sequence 30, 31, 32 and 77, moves to step 78, performs switch input processing including the release switch, and goes into standby status. If there is no change in status of the rear cover switch 12 the microcomputer 10 moves from step 32 to the 77. When the rear cover of the camera is opened and the rear cover switch 12 is "off", the microcomputer 10, in step 32 goes into a standby status. When the main switch 11 is "off", the microcomputer 10 goes into standby status.

When the number of unexposed frames is "0" and there is no first frame set signal the microcomputer 10, following the power-on reset sequence of steps 68, 69, 70 and 76, in FIG. 7 moves to step 79 and performs a power-on reset. During power-on reset, the microcomputer 10, will display a power-on reset signal and complete rewinding of the film to the patrone.

In a preferred embodiment, the total number of exposures of the patrone is written to the E²PROM before the start of pre-winding, the number of unexposed frames stored in the E²PROM is decremented by 1 for every frame wound to the spool during pre-winding and the updated number of unexposed frames is written to the E²PROM. When first frame setting commences, a first frame set signal is written to the E²PROM, and at the completion of first frame setting, the first frame set signal is erased When the battery is replaced during pre-winding, pre-winding is continued based on the number of unexposed frames stored in the E²PROM. When the battery is replaced during first frame setting, first frame setting is continued based on the first frame set signal stored in the E²PROM. In this way, film waste can be prevented and the need to load a new film can be avoided.

From the foregoing it will now be apparent that a new and improved pre-winding control device of a camera has been found. It should be understood of course that the embodiments disclosed are merely illustrative and are not intended to limit the scope of the invention. Reference should be made to the appended claims, therefore, rather than the specifications as indicating the scope of the invention.

What is claimed is:

1. A pre-winding control device of a camera comprising:
    an electrically rewritable non-volatile memory E²PROM;
    reading means for reading a picturable total number of frames of a film from a patrone loaded in the camera;
    first writing means, responsive to a closing of a rear cover of the camera, for inputting the picturable total number of frames of the patrone from said reading means and for writing the picturable total number of frames of the patrone to said E²PROM;
    pre-winding means, responsive to an end of writing of said first writing means, for starting a pre-winding for winding the film of the patrone to a spool, said pre-winding means counting a picturable number of frames of the film which are wound to the spool, and said pre-winding means finishing the pre-winding by winding the film of the a patrone to the spool completely;
    decrement means, responsive to the counting of the picturable number of frames by said pre-winding means, for decreasing the picturable total number of frames of the patrone by 1 each time said pre-winding means counts the picturable number of frames of the film wound to the spool, and for providing a decreased picturable number of frames by subtracting the picturable number of frames wound to the spool from the picturable total number of frames of the patrone;
    second writing means, responsive to said decrement means, for writing the decreased picturable number of frames to said E²PROM instead of the picturable total number of frames of the patrone, the decreased picturable number of frames in said E²PROM equalling "0" if the pre-winding is finished, and the decreased picturable number of frames in said E²PROM not equalling "0" if the pre-winding is interrupted;
    recognizing means, responsive to a loading of a battery in the camera, for judging whether the decreased picturable number of frames in said E²PROM is "0", for recognizing that the pre-winding has finished when the decreased picturable number of frames in said E²PROM is "0" and recognizing that the pre-winding has been interrupted when the decreased picturable number of frames in said E²PROM is not "0"; and
    pre-winding continuing means, responsive to said recognizing means, for driving said pre-winding means based on the decreased picturable number of frames in said E²PROM and continuing the pre-winding when the decreased picturable number of frames in said E²PROM is not "0".

2. The device of claim 1, further comprising:
    frame pulse generating means for generating a frame pulse each time the film is fed by a prescribed length;
    judging means, responsive to said frame pulse generating means and a start of pre-winding by said pre-winding means, for judging whether the frame pulse is generated by said frame pulse generating means within a prescribed time after a start of pre-winding by said pre-winding means, said judging means judging that the start of pre-winding is not normal when the frame pulse is not generated within the prescribed time after the start of pre-winding; and
    stopping means, responsive to said judging means, for stopping pre-winding when said judging means judges that the start of pre-winding is not normal.

3. The device of claim 1, further comprising frame pulse generating means for generating a frame pulse each time the film is fed by a prescribed length;
    wherein said pre-winding means includes counting means for counting the picturable number of frames of the film which are wound to the spool from the patrone.

4. The device of claim 1, further comprising frame pulse generating means for generating a frame pulse each time the film is fed by a prescribed length;
    wherein said pre-winding means includes,
        finishing means, responsive to said frame pulse generating means, for finishing the pre-winding by recognizing that the film of the patrone is wound to the spool completely when the frame pulse is not generated for more than a predetermined time and the decreased picturable number of frames in said E²PROM is "0", and stopping means, responsive to said frame pulse generating means, for stopping the pre-winding by recognizing that an anomaly, including a dead battery, has occurred during the pre-winding when the frame pulse is not generated for more than the predetermined time and the decreased picturable number of frames in said E²PROM is not "0".

5. The device of claim 1, wherein pre-winding continuing means includes, first input means for inputting the picturable total number of frames of the patrone from said reading means;

second input means for inputting the decreased picturable number of frames from said E²PROM;

computing means, responsive to said first and second input means, for computing a number of frames which have been wound to the spool from the patrone, based on the picturable total number of frames of the patrone and the decreased picturable number of frames in said E²PROM; and continuing means, responsive to said computing means, for continually driving said pre-winding means based on the number of frames computed by said computing means.

6. The device of claim 1, further comprising;

first frame setting means, responsive to a finish of the pre-winding of said pre-winding means, for starting a first frame setting of the film, the film wound to the spool by said pre-winding means rewinding to the patrone from the spool by a first prescribed length by a start of the first frame setting, said first frame setting means finishing the first frame setting by rewinding the film to the patrone by the first prescribed length;

first frame set signal rewriting means for writing a first frame set signal to said E²PROM in response to the start of the first frame setting of said first frame setting means, and erasing the first frame set signal in said E²PROM in response to a finish of a first frame setting of said first frame setting means;

first frame setting continuing means, responsive to the loading of the battery in the camera, for driving said first frame setting means to continue the first frame setting when said first frame set signal is stored in said E²PROM, after battery replacement.

7. The device of claim 6, further comprising frame pulse generating means for generating a frame pulse each time the film is fed by a second prescribed length;

wherein said first frame setting means includes finishing means, responsive to said frame pulse generating means, for finishing the first frame setting when a predetermined number of pieces of frame pulses are generated after starting the first frame setting.

8. The device of claim 6, further comprising:

frame pulse generating means for generating a frame pulse each time the film is fed by a second prescribed length;

battery check means for detecting whether a voltage of the battery is above a predetermined voltage;

said first frame setting means including, processing means, responsive to said frame pulse generating means and said battery check means, for stopping the first frame setting and for erasing the first frame set signal in said E²PROM by recognizing that an anomaly has occurred in feeding the film when the frame pulse is not generated for more than a predetermined time and the voltage of the battery is above the predetermined voltage, and stopping means, responsive to said frame pulse generating means and said battery check means, for stopping the first frame setting by recognizing that the battery is dead when the frame pulse is not generated for more than the predetermined time and the voltage of the battery is below the predetermined voltage.

9. The device of claim 3, said counting means setting a "1" when a first predetermined number of pieces of frame pulses are generated after starting pre-winding, and for incrementing by 1 each time a second predetermined number of pieces of frame pulses is generated.

* * * * *